United States Patent
Rahman et al.

(10) Patent No.: US 9,860,078 B2
(45) Date of Patent: Jan. 2, 2018

(54) TIME DOMAIN INGRESS NOISE DETECTION AND CANCELLATION

(71) Applicant: Futurewei Technologies, Inc., Plano, TX (US)

(72) Inventors: Syed Habib Rahman, Santa Clara, CA (US); Fan Wang, Wuhan (CN); Xiaoshu Si, Wuhan (CN); Tao Ouyang, Wuhan (CN); Chuan Niu, Xi'an (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/966,244

(22) Filed: Dec. 11, 2015

(65) Prior Publication Data

US 2017/0170982 A1  Jun. 15, 2017

(51) Int. Cl.
| | | |
|---|---|---|
| *H04B 10/06* | (2006.01) | |
| *H04L 12/28* | (2006.01) | |
| *H04B 10/60* | (2013.01) | |
| *H04L 25/03* | (2006.01) | |

(52) U.S. Cl.
CPC ......... *H04L 12/2885* (2013.01); *H04B 10/60* (2013.01); *H04L 25/03019* (2013.01)

(58) Field of Classification Search
CPC .......... H04L 12/2885; H04L 25/03019; H04B 10/60; H04B 10/61; H04B 10/66; H04B 10/695; H04B 10/00; H04B 10/07955; H04B 10/616; H04B 10/63; G02B 6/29394; H04J 14/02; H04J 14/0221
USPC .......................................... 398/208, 158, 94
See application file for complete search history.

(56) References Cited

U.S. PATENT DOCUMENTS

| | | | |
|---|---|---|---|
| 4,947,361 A | 8/1990 | Smith et al. | |
| 2008/0107217 A1 | 5/2008 | Vrcelj et al. | |
| 2015/0098534 A1 | 4/2015 | Meller et al. | |
| 2015/0103931 A1* | 4/2015 | Yanagisawa | H04B 1/10 375/257 |
| 2016/0087662 A1* | 3/2016 | Kobayashi | H04L 25/03834 375/260 |

FOREIGN PATENT DOCUMENTS

| | | |
|---|---|---|
| CN | 102098258 A | 6/2011 |
| CN | 102281044 A | 12/2011 |
| CN | 103248337 A | 8/2013 |

OTHER PUBLICATIONS

"Data-Over-Cable Service Interface Specifications DOCSIS® 3.0, MAC and Upper Layer Protocols Interface Specification," "CM-SP-MULPIv3.0-I28-150827," Cable Television Laboratories, Inc., 2006-2015, 796 pgs.

(Continued)

*Primary Examiner* — M. R. Sedighian
(74) *Attorney, Agent, or Firm* — Conley Rose, P.C.

(57) ABSTRACT

An apparatus, comprising a receiver configured to receive a primary signal that comprises a narrowband noise component and a broadband noise component, a processor coupled to the receiver and configured to determine, in a time domain, an estimate of the narrowband noise component in real-time, determine a cancelled output signal in real-time that comprises an estimate of the broadband noise component, and determine an estimate of a power level of the narrowband noise component in real-time.

17 Claims, 10 Drawing Sheets

(56) References Cited

OTHER PUBLICATIONS

"Data-Over-Cable Service Interface Specifications DOCSIS® 3.1, MAC and Upper Layer Protocols Interface Specification," "CM-SP-MULPIv3.1-I07-150910," Cable Television Laboratories, Inc., 2013-2015, 816 pgs.

"Data Over Cable Service Interface Specifications DOCSIS® 3.0, Physical Layer Specification," "CM-SP-PHYv3.0-I12-150305," Cable Television Laboratories, Inc., 2006-2015, 184 pgs.

"Data-Over-Cable Service Interface Specifications DOCSIS® 3.1, Physical Layer Specification," "CM-SP-PHYv3.1-I07-150910," Cable Television Laboratories, Inc., 2013-2015, 244 pgs.

Machine Translation and Abstract of Chinese Publication No. CN102098258, Jun. 15, 2011, 12 pages.

Machine Translation and Abstract of Chinese Publication No. CN103248337, Aug. 14, 2013, 10 pages.

Foreign Communication From A Counterpart Application, PCT Application No. PCT/CN2016/108247, International Search Report dated Feb. 16, 2017, 4 pages.

\* cited by examiner

TIME DOMAIN INGRESS NOISE DETECTION AND CANCELLATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In certain signal processing schemes or communications systems, for example, Data-Over-Cable Service Interface Specifications (DOCSIS) and Ethernet passive optical network (EPON) over Coaxial (EPoC), an upstream band-limited data signal is corrupted with narrowband ingress noise and broadband additive white Gaussian noise (AWGN). Without compensation for the narrowband ingress noise, processing of the data signal by a receiver in the communications systems is impaired. Therefore, effectively and efficiently compensating the corrupted data signal is desirable.

SUMMARY

In some embodiments, the disclosure includes an apparatus, comprising a receiver configured to receive a primary signal that comprises a narrowband noise component and a broadband noise component, a processor coupled to the receiver and configured to determine, in a time domain, an estimate of the narrowband noise component in real-time, determine a cancelled output signal in real-time that comprises an estimate of the broadband noise component, and determine an estimate of a power level of the narrowband noise component in real-time.

in some embodiments, the processor further comprises a decorrelating adaptive line enhancer (ALE) comprising a first delay module configured to determine a reference signal according to the primary signal and a first amount of delay, a decorrelating adaptive filter coupled to the first delay module and configured to determine the estimate of the narrowband noise component, and a first summation module coupled to the decorrelating adaptive filter and configured to subtract the estimate of the narrowband noise component from the primary signal to determine the cancelled output signal.

In some embodiments, the decorrelating adaptive filter comprises a second delay module configured to determine a delayed reference signal according to the reference signal and a second amount of delay, a first multiplication module configured to determine a first multiplication result according to a relationship between a first filter coefficient and the reference signal, a second multiplication module configured to determine a second multiplication result according to a relationship between a second filter coefficient and the delayed reference signal, and a second summation module configured to determine the estimate of the narrowband noise component according to a relationship between the first multiplication result and the second multiplication result.

In some embodiments, the decorrelating adaptive filter is further configured to determine the first filter coefficient according to a relationship between the cancelled output signal, the reference signal, and a first preceding filter coefficient, and determine the second filter coefficient according to a relationship between the cancelled output signal, the delayed reference signal, and a second preceding filter coefficient.

In some embodiments the processor further comprises a comparator configured to compare the estimate of the power level of the narrowband noise component with a threshold value to form a first comparison output signal when the estimate of the power level of the narrowband noise component is less than or equal to the threshold value, and compare the estimate of the power level of the narrowband noise component with the threshold value to form a second comparison output signal when the estimate of the power level of the narrowband noise component is greater than the threshold value, a third delay module configured to determine a delayed primary signal according to the primary signal and a third amount of delay, and a multiplexer configured to receive the delayed primary signal, the cancelled output signal, and the first comparison output signal or the second comparison output signal, output the delayed primary signal when the first comparison output signal indicates that the estimate of the power level of the narrowband noise component is less than or equal to the threshold value, and output the cancelled output signal when the second comparison output signal indicates that the estimate of the power level of the narrowband noise component is greater than the threshold value.

In some embodiments, the primary signal further comprises a data component, and wherein the cancelled output signal further comprises an estimate of the data component. In some embodiments, the processor is further configured to determine the estimate of the power level of the narrowband noise component with respect to the data component. In some embodiments, the apparatus is a cable modem termination system (CMTS) receiver. In some embodiments, the communications network comprises a DOCSIS. In some embodiments, the processor is further configured to operate in the time domain and not operate in a frequency domain.

In another embodiment, the disclosure includes a method, comprising receiving, by a network element operating in real-time in a time domain, a data signal from an upstream source, determining in the time domain and by the network element operating in real-time, a reference signal according to the received signal, determining in the time domain and by the network element operating in real-time, an error signal according to the received signal, and determining in the time domain and by the network element operating in real-time, an estimate of a narrowband noise of the reference signal.

In some embodiments, the received signal comprises a datum, a broadband noise, and the narrowband noise. In some embodiments, the error signal comprises an estimate of the datum corrupted with the broadband noise. In some embodiments, the reference signal comprises the received signal delayed by a predetermined amount of delay. In some embodiments, the estimate of the narrowband noise is determined according to a relationship between the error signal and the reference signal.

In yet another embodiment, the disclosure includes a network element comprising a receiver configured to receive a signal from an upstream source, and a processor coupled to the receiver and configured to determine, in a time domain and operating in real-time, an estimate of a narrowband noise of the signal, and determine, in the time domain and operating in real-time, an estimate of a power level of the narrowband noise.

In some embodiments, the processor is further configured to manage the received signal according to the estimate of the power level of the narrowband noise. In some embodiments, managing the received signal comprises transmitting a desired signal parameter to the upstream source. In some embodiments, the estimate of the power level of the narrowband noise is greater than or equal to about −30 decibels relative to a power level of the signal. In some embodiments, the processor determines the estimate of the power level of the narrowband noise according to a relationship between an average of the estimate of the narrowband noise and an average of the signal.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
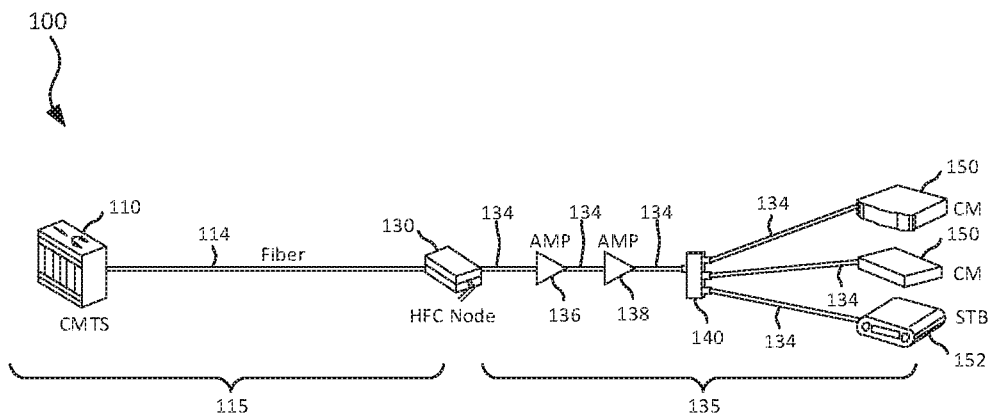
FIG. 1 is a schematic diagram of an embodiment of a DOCSIS network.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Some hybrid access networks combine optical networks with coaxial (coax) networks. Ethernet over Coax (EoC) is a generic name used to describe all technologies that transmit Ethernet frames over a coaxial network. Examples of EoC technologies may include EPoC, DOCSIS, Multimedia over Coax Alliance (MoCA), G.hn (a common name for a home network technology family of standards developed under the International Telecommunication Union (ITU) and promoted by the HomeGrid Forum), home phoneline networking alliance (HPNA), and home plug audio/visual (A/V). EoC technologies have been adapted to run outdoor coax access from an Optical Network Unit (ONU) to an EoC head end with connected Customer Premises Equipment (CPEs) located in subscriber homes. In a coaxial network, physical layer transmission may employ orthogonal frequency-division multiplexing (OFDM) to encode digital data onto multiple carrier frequencies. Some advantages of OFDM transmission include high spectral efficiency and robust transmission (e.g., attenuation at high frequencies in long coaxial wires, narrow band interferers, frequency selective noise, etc.). A DOCSIS network may operate over a Hybrid Fiber Coax (HFC) network. The DOCSIS network may comprise a CMTS positioned in a local exchange or central office where the CMTS connects the HFC network to a backbone network. The CMTS may serve a plurality of cable modems (CMs) positioned at end-user locations.

Disclosed herein are embodiments that provide for real-time determination and cancellation of narrowband, or ingress, noise in a received signal that includes narrowband noise, broadband noise, and data in a time domain. The narrowband noise is determined and cancelled in the presence of the data and without scheduling a quiet-time in a transmission during which data is not transmitted. To determine the narrowband noise, the disclosed embodiments decorrelate an oversampled signal according to a decorrelating adaptive filter of an ALE and process the signal further according to the ALE. Embodiments of the present disclosure further provide for real-time determination of narrowband noise power in the time domain for narrowband noise power levels greater than, or equal to, −20 dBc. Real-time determination of the determination and cancellation of the narrowband noise and determination of narrowband noise power is achieved in real-time by performing the determination and cancellations solely in the time-domain. Embodiments of the present disclosure further provide for a selectable narrowband noise cancellation unit that enables selective cancellation of narrowband noise in the signal according to a determination based on a comparison of the narrowband noise power and a threshold value.

FIG. 1 is a schematic diagram of an embodiment of a DOCSIS network 100. The DOCSIS network 100 comprises a DOCSIS 3.0 network as specified in DOCSIS CM-SP-PHYv3.0-112-150305 and CM-SP-MULPIv3.0-128-150827, which are incorporated herein by reference as if reproduced in their entirety. Alternatively, the DOCSIS network 100 comprises a DOCSIS 3.1 network as specified in DOCSIS 3.1 documents CM-SP-PHYv3.1-107-150910 and CM-SP-MULPIv3.1-107-150910, which are incorporated herein by reference as if reproduced in their entirety. The network 100 comprises a CMTS 110, at least one HFC node 130, and any number of CMs 150 and/or set-top boxes (STBs) 152. The RFC node 130 is coupled to the CMTS 110 via an optical fiber 114, and the CMs 150 and/or the STBs 152 are coupled to the HFC node 130 via electrical cables 134, one or more amplifiers (e.g., amplifiers 136 and 138), and at least one splitter 140.

The CMTS 110 is any device configured to communicate with the CMs 150 via the HFC node 130. The CMTS 110 acts as an intermediary between the CMs 150 and another network for example, a backbone network such as the Internet. The CMTS 110 forwards data received from the backbone network to the CMs 150 and forwards data received from the CMs 150 onto the backbone network. The CMTS 110 comprises an optical transmitter and an optical receiver transmitting and/or receiving messages from the CMs 150 via the optical fiber 114. The CMTS 110 further comprises transmitters and/or receivers for communicating with the backbone network. Alternatively, the CMTS 110 comprises a transceiver that incorporates and performs the functions of both and optical transmitter and an optical receiver. When the backbone network employs a network protocol that is different from the protocol used in the network 100, the CMTS 110 comprises a converter that converts the backbone network protocol into the protocol of the network 100. The CMTS 110 converter also converts the network 100 protocol into the backbone network protocol. The CMTS 110 is further configured to schedule upstream and downstream transmissions across the network 100, so that transmissions between the CMTS 110 and the CMs 150 are separated in the time and/or frequency domain, which allows the transmissions to be separated at an associated destination. An allocation of time and/or frequency resources is transmitted to the CMs 150 via an Uplink Media Access Plan (UL-MAP) messages and/or Downlink Media Access Plan (DL-MAP) messages.

The CMs 150 and the STBs 152 are any devices that are configured to communicate with the CMTS 110 and any subscriber devices in a local network. The CMs 150 and the STBs 152 act as intermediaries between the CMTS 110 and such subscriber devices. The CMs 150 and the STBs 152 may be similar devices, but may be employed to couple to different subscriber devices in some embodiments. For example, an SIB 152 may be configured to interface with a television, while a CM 150 may be configured to interface with any local network device with an Internet Protocol (IP) and/or Media Access Control (MAC) address, such as a local computer, a wired and/or wireless router, or local content server, a television, etc. The CMs 150 forward data received from the CMTS 110 to the subscriber devices, and forward data received from subscriber devices toward the CMTS 110. Although the specific configuration of the CMs 150 may vary depending on the type of the network 100, in an embodiment, the CMs 150 comprise an electrical transmitter configured to send electrical signals to the CMTS 110 via the HFC node 130 and an electrical receiver configured to receive electrical signals from the CMTS 110 via the HFC node 130. Additionally, the CMs 150 comprise converters that convert the network 100 electrical signals into electrical signals for subscriber devices, such as signals in Institute of Electrical and Electronics Engineers (IEEE) 802.11 wireless local area network (WiFi) protocol. The CMs 150 further comprise a second transmitter and/or receiver that send and/or receive the converted electrical signals to the subscriber devices. In some embodiments, the CMs 150 and Coaxial Network Terminals (CNTs) are similar, and thus the terms are used interchangeably herein. The CMs 150 are typically located at distributed locations, such as the customer premises, but may be located at other locations as well. The CMs 150 transmit a configurable number of OFDM frames upstream toward the CMTS 110 via the HFC node 130 as part of a transmission burst. An OFDM frame is a communication burst of a specified duration comprising a signal with a plurality of frequency based subcarriers. An OFDM frame comprises a configurable number of OFDM symbols with smaller durations than the OFDM frame.

The HFC node 130 is positioned at the intersection of an Optical Distribution Network (ODN) 115 comprising the optical fiber 114 and an Electrical Distribution Network (EDN) 135. HFC node 130 may include electro-optical signal translation capabilities (e.g., Open Systems Interconnection (OSI) model layer 1 capabilities). The MFC node 130 may not be configured to perform routing, buffering, or other higher layer functions (e.g., OSI model layer 2-7). Accordingly, the HFC node 130 translates optical signals received from the optical fiber 114 into electrical signals and forwards the electrical signals toward the CMs 150 and the STBs 152, and vice-versa. It should be noted that that the HFC node 130 may be remotely coupled to the CMTS 110 or reside in the CMTS 110. In some embodiments, the CMTS 110 is equipped with part or all of the functionalities of the HFC node 130.

The ODN 115 is a data distribution system that comprises the optical fiber 114 cables, couplers, splitters, distributors, and/or other equipment. In an embodiment, the optical fiber 114 cables, couplers, splitters, distributors, and/or other equipment are passive optical components. The optical fiber 114 cables, couplers, splitters, distributors, and/or other equipment are components that do not require any power to distribute data signals between the CMTS 110 and the HFC node 130. It should be noted that the optical fiber 114 cables may be replaced by any optical transmission media. In some embodiments, the ODN 115 comprises one or more optical amplifiers. In some embodiments, data distributed across the ODN 115 are combined with cable television (CATV) services using multiplexing schemes. The ODN 115 extends from the CMTS 110 to the HFC node 130 as shown in FIG. 1, but may be alternatively configured as determined by a person of ordinary skill in the art. Signals transmitted across the ODN 115 may be transmitted as analog signals and/or as digital signals.

The EDN 135 is a data distribution system that comprises electrical cables (e.g., coaxial cables, twisted wires, etc.), couplers, splitters, distributors, and/or other equipment. In an embodiment, the electrical cables, couplers, splitters, distributors, and/or other equipment are passive electrical components. The electrical cables, couplers, splitters, distributors, and/or other equipment are components that do not require any power to distribute data signals between the HIV node 130 and the CMs 150. It should be noted that the electrical cables may be replaced by any electrical transmission media in some embodiments. In some embodiments, the EDN 135 comprises one or more electrical amplifiers. The EDN 135 extends from the HFC node 130 and the CMs 150 in a branching configuration as shown in FIG. 1, but may be alternatively configured as determined by a person of ordinary skill in the art.

A data transmission received by the CMTS 110 from a CM 150 can include broadband noise and narrowband noise in addition to intended data. The broadband noise and the narrowband noise, if left uncompensated for, for example if not cancelled, can inhibit processing of the data transmission. To cancel one or both of the broadband noise and the narrowband noise, the CMTS 110 implements noise cancellation and power estimation according to various embodiments of the present disclosure.

Figure 2:
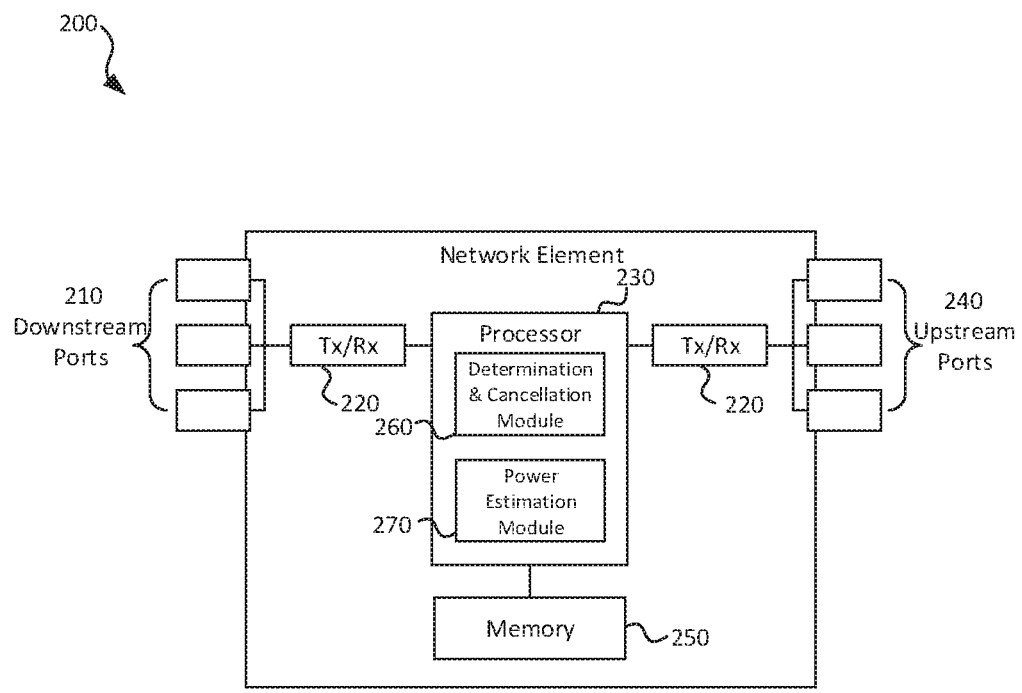
FIG. 2 is a schematic diagram of an embodiment of a network element.

FIG. 2 is a schematic diagram of an embodiment of a network element for operating in an optical communications network. For example, the network element 200 is the CMTS 110 in the DOCSIS network 100 in one example embodiment. At least some of the features/methods described in this disclosure are implemented in the network element 200. For instance, the features/methods of this disclosure are implemented using hardware, firmware, and/or software installed to run on hardware. The network element 200 is a device (e.g., an access point, an access point station, a router, a switch, a gateway, a bridge, a server, a client, a user-equipment, a mobile communications device, etc.) that transports data through a network, system, and/or domain and/or any device that provides services to other devices in a network or performs computational functions. Moreover, the terms "network element," "network node," "network component," "network module," and/or similar terms may be interchangeably used to generally describe a network device and do not have a particular or special meaning unless otherwise specifically stated and/or claimed within the disclosure. In one embodiment, the network element 200 is an apparatus configured to implement the decorrelating ALE 400, the decorrelating adaptive filter 600, or the ingress noise cancellation unit 700 to perform the methods 1000, 1100, and 1200.

The network element 200 comprises one or more downstream ports 210 coupled to a transceiver (Tx/Rx) 220, which are transmitters, receivers, or combinations thereof. The Tx/Rx 220 transmits and/or receives frames from other network nodes via the downstream ports 210. Similarly, the network element 200 comprises another Tx/Rx 220 coupled to a plurality of upstream ports 240, wherein the Tx/Rx 220 transmits and/or receives frames from other nodes via the upstream ports 240. The downstream ports 210 and/or the upstream ports 240 may include electrical and/or optical transmitting and/or receiving components in another embodiment, the network element 200 comprises one or more antennas coupled to the Tx/Rx 220. The Tx/Rx 220 transmits and/or receives data (e.g., packets) from other network elements wirelessly via the one or more antennas.

A processor 230 is coupled to the Tx/Rx 220 and is configured to process a data transmission to determine and cancel narrowband ingress noise. In an embodiment, the processor 230 comprises one or more multi-core processors and/or memory modules 250, which functions as data stores, buffers, etc. The processor 230 is implemented as a general processor or as part of one or more application specific integrated circuits (ASICs), field-programmable gate arrays (FPGAs), and/or digital signal processors (DSPs). Although illustrated as a single processor, the processor 230 is not so limited and alternatively comprises multiple processors. The processor 230 further comprises a determination and cancellation module 260 that is configured to determine and cancel narrowband ingress noise in a data signal, and a power estimation module 270 that is configured to determine a power level of the narrowband ingress noise in the data signal.

FIG. 2 also illustrates that a memory module 250 is coupled to the processor 230 and is a non-transitory medium configured to store various types of data. Memory module 250 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 250 may be used to house the instructions for carrying out the various embodiments described herein. For example, alternatively, the memory module 250 comprises the determination and cancellation module 260 and the power estimation module 270 both of which are executed according to instructions from processor 230.

It is understood that by programming and/or loading executable instructions onto the network element 200, at least one of the processor 230 and/or the memory 250 are changed, transforming the network element 200 in part into a particular machine or apparatus, for example, a CMTS having the novel functionality taught by the present disclosure it is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by design rules well-known in the art, to an equivalent hardware implementation in an AMC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program, in this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM, flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 3:
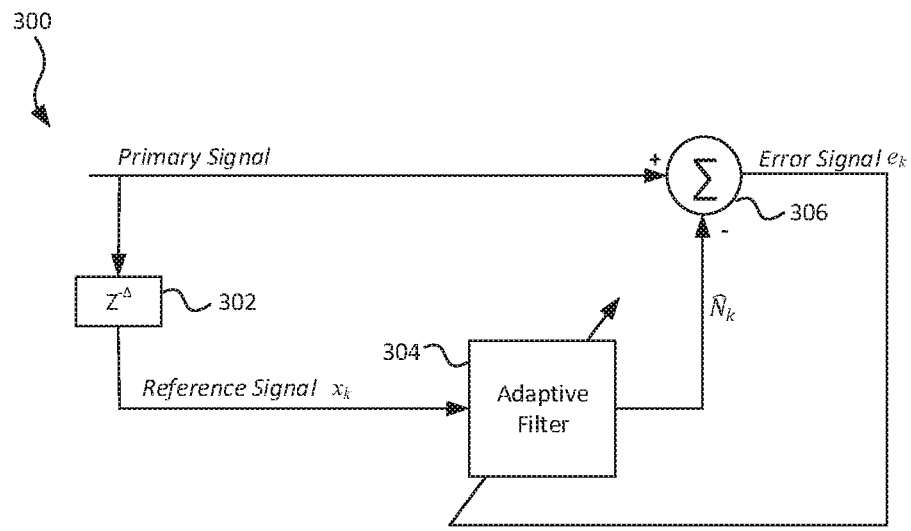
FIG. 3 is a schematic diagram of an embodiment of an ALE.

FIG. 3 is a schematic diagram of an embodiment of an ALE 300. The ALE 300 is implemented in a CMTS, such as the CMTS 110, and extracts a narrowband ingress noise ($N_k$) from broadband signal noise ($B_k$) that both exist in the same signal transmission, for example a primary signal ($P_k$) between two devices such as the CMTS 110 and the CM 150. By definition, the broadband signal noise is an uncorrelated signal, and the narrowband ingress noise is a correlated signal. To extract the narrowband ingress noise from the broadband signal noise, the ALE 300 determines an estimate of the narrowband ingress noise ($\hat{N}_k$). Estimating the narrowband ingress noise includes the ALE 300 determining a reference signal ($e_k$) according to a delay module 302, and processing the reference signal and an error signal ($e_k$), using an adaptive filter 304. The reference signal is a delayed signal that is based on the primary signal and delayed by the delay module 302 for an amount of time delta ($\Delta$). The error signal is determined by a summation module 306 as an approximation of the broadband noise signal that is a result of removing the estimate of the narrowband ingress noise from the primary signal. Delaying the primary signal to form the reference signal decorreates the broadband noise signal between the primary signal and the reference signal, thereby facilitating processing of both the primary signal and the reference signal by the ALE 300 to determine the broadband noise signal of the primary signal and the narrowband ingress noise according to the reference signal.

The adaptive filter 304 receives the reference signal from the delay module 302 and the error signal from the summation module 306 and, based on the reference signal, the error signal, and a plurality of filter coefficients (e.g., filter taps), determines the estimate of the narrowband ingress noise. The particular adaptive filter 304 that is used in the ALE 300 may be any suitable filter understood by one of ordinary skill in the art, for example, a least mean square (LMS) traversal filter. The summation module 306 receives the primary signal and the estimate of the narrowband ingress noise from the adaptive filter 304 and subtracts the estimate of the narrowband ingress noise from the primary signal to generate the error signal. The error signal is then transmitted by the summation module 306 to the adaptive filter 304. The adaptive filter 304 updates the filter coefficients according to the error signal to improve accuracy of the estimate of the narrowband ingress noise. With each error signal transmitted to the adaptive filter 304 by the summation module 306, the estimate of the narrowband ingress noise produced by the adaptive filter 304 converges to the narrowband ingress noise, for example, the estimate of the narrowband ingress noise progressively becomes closer to the narrowband ingress noise until the estimate of the narrowband ingress noise and the narrowband ingress noise are approximately the same. Correspondingly, as the estimate of the narrowband ingress noise converges to the narrowband ingress noise, the error signal converges to the broadband signal noise, for example, the error signal progressively becomes closer to the broadband signal noise until the error signal and the broadband signal noise are approximately the same.

Figure 4:
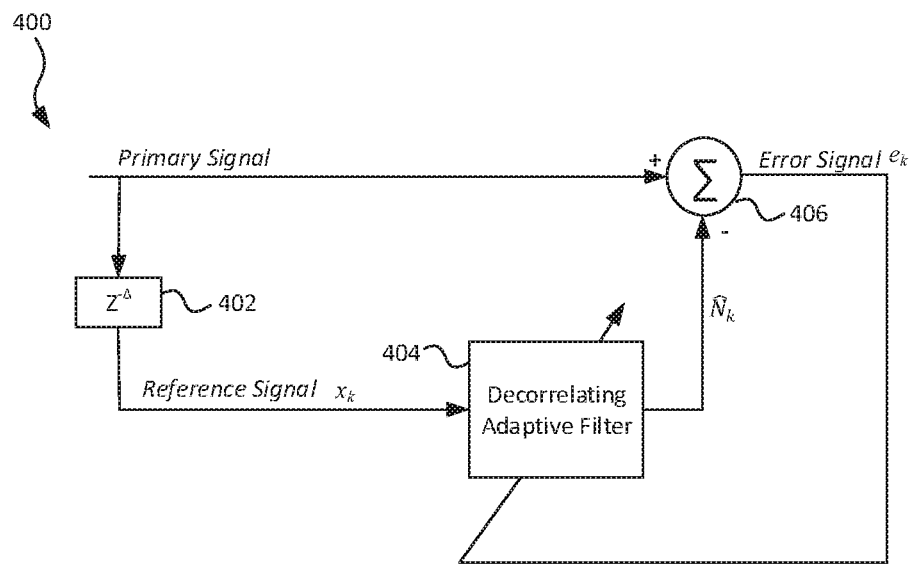
FIG. 4 is a schematic diagram of an embodiment of a decorrelating ALE.

FIG. 4 is a schematic diagram of an embodiment of a decorrelating ALE 400. The ALE 400 is implemented in a CMTS, such as the CMTS 110, in place of the ALE 300 to provide expanded capabilities for processing a received signal. The ALE 400 extracts a $N_k$ from $B_k$ and band-limited data signal ($D_k$), and all of which exist in the same signal transmission, for example, a primary signal ($P_k$), between two devices such as the CMTS 110 and the CM 150. The ALE 400 may further be implemented in a first stage of an ingress noise cancellation, such as at the step 912 of the method 900. By definition, the broadband signal noise is an uncorrelated signal, the narrowband ingress noise is a correlated signal, and the oversampled band-limited data signal is a correlated signal. However, the broadband noise signal, the narrowband ingress noise, and the band-limited data signal are uncorrelated to each other in the primary signal. To extract the narrowband ingress noise from the broadband signal noise and the band-limited data, the ALE 400 determines an estimate of the narrowband ingress noise ($\hat{N}_k$). Estimating the narrowband ingress noise includes the ALE 400 determining a reference signal $x_k$ according to a delay module 402, and processing the reference signal and an error signal $e_k$ using a decorrelating adaptive filter 404. The reference signal is a delayed signal that is based on the primary signal and delayed by the delay module 402 for an amount of time $\Delta$. The error signal is determined by a summation module 406 as an approximation of the broadband noise signal and the band-limited data signal that is a result of removing the estimate of the narrowband ingress noise from the primary signal. The error signal further comprises a cancelled output signal of the ALE 400. Delaying the primary signal to form the reference signal decorrelates the broadband noise signal and the band-limited data signal between the primary signal and the reference signal, thereby facilitating processing of both the primary signal and the reference signal by the ALE 400 to determine the broadband noise signal and band-limited data signal of the primary signal and the narrowband ingress noise according to the reference signal.

The decorrelating adaptive filter 404 receives the reference signal from the delay module 402 and the error signal from the summation module 406 and, based on the reference signal, the error signal, and a plurality of filter coefficients (e.g., filter taps), determines the estimate of the narrowband ingress noise. The summation module 406 receives the primary signal and the estimate of the narrowband ingress noise from the decorrelating adaptive filter 404 and subtracts the estimate of the narrowband ingress noise from the primary signal to generate the error signal. The error signal is then transmitted by the summation module 406 to the decorrelating adaptive filter 404. The decorrelating adaptive filter 404 updates the filter coefficients according to the error signal to improve accuracy of the estimate of the narrowband ingress noise. With each error signal transmitted to the decorrelating adaptive filter 404 by the summation module 406, the estimate of the narrowband ingress noise produced by the decorrelating adaptive filter 404 converges to the narrowband ingress noise such that the estimate of the narrowband ingress noise progressively becomes closer to the narrowband ingress noise until the estimate of the narrowband ingress noise and the narrowband ingress noise are approximately the same. Correspondingly, as the estimate of the narrowband ingress noise converges to the narrowband ingress noise, the error signal converges to a combination of the broadband signal noise and the hand-limited data signal such that the error signal progressively becomes closer to the combination of the broadband signal noise and the band-limited data signal until the error signal and the combination of the broadband signal noise and the hand-limited data signal are approximately the same. The error signal that is output by the ALE 400 comprises the primary signal after cancellation of the narrowband signal noise, also referred to as the primary signal with noise cancellation, as determined by the summation module 406.

Figure 5:
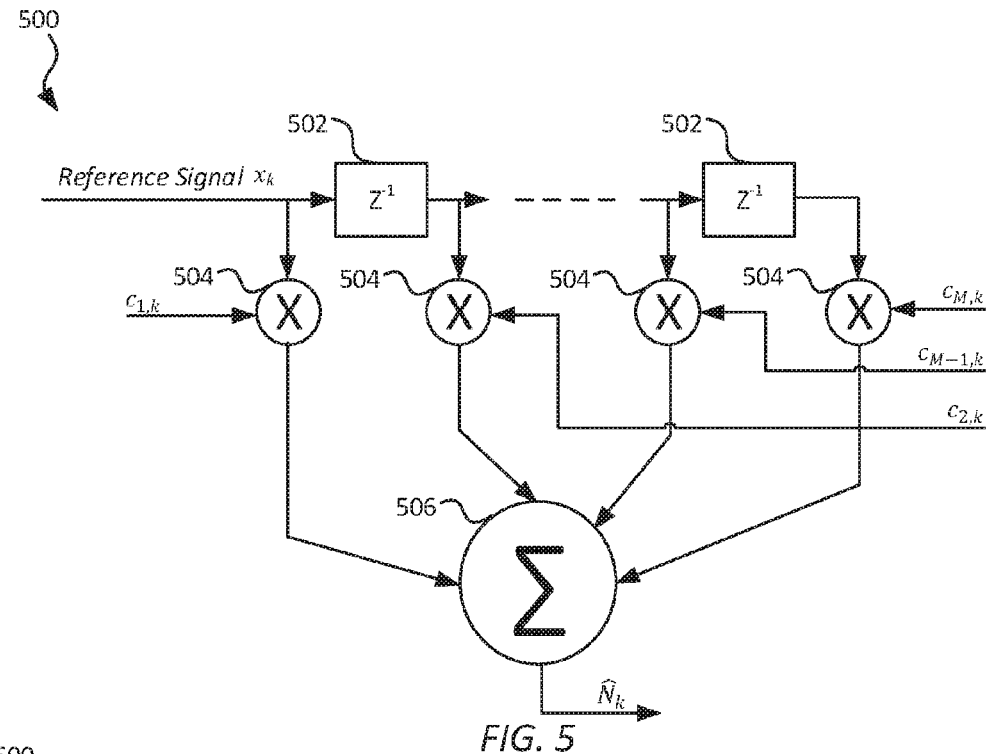
FIG. 5 is a schematic diagram of an embodiment of an adaptive filter.

FIG. 5 is a schematic diagram of an embodiment of an adaptive filter 500. The adaptive filter 500 is implemented in an ALE, such as the adaptive filter 304 in the ALE 300, which may be implemented in the CMTS 110. The adaptive filter 500 comprises an LMS traversal filter and is one embodiment of the adaptive filter 304. The adaptive filter 500 determines the estimate of the narrowband ingress noise according to a filter algorithm, for example, an LMS algorithm that comprises a plurality of incremental steps. Alternatively, the adaptive filter 500 is any suitable filter type understood by one of ordinary skill in the art. The adaptive filter 500 is implemented in an ALE, such as the ALE 300, and receives a reference signal that is a delayed version of a primary signal. The adaptive filter 500 additionally receives an error signal that is an output of the ALE. Using the error signal, the adaptive filter 500 determines a plurality of filter coefficients, which may also be referred to as filter taps. The adaptive filter 500 then determines the estimate of the narrowband ingress noise based on the reference signal and the filter coefficients, and according to:

$$\hat{N}_k = \sum_{i=1}^{M} c_{i,k} * x_{k-i+1} \quad (1)$$

in which $c_{i,k}$ is the current filter coefficient, M is a total number of filter coefficients used, and is the reference signal delayed by an additional amount.

The adaptive filter 500 determines the filter coefficients according to a coefficient module (not shown). The coefficient module determines the filter coefficients based on the reference signal and the error signal, and according to:

$$c_{i,k+1} = c_{i,k} + \mu e_k^* * x_{k-i+1} \quad (2)$$

in which $c_{i,k+1}$ is a next filter coefficient as determined by the coefficient module, μ is a step size of the LMS algorithm, and $e_k^*$ is a conjugate of the error signal. After the coefficient module determines the filter coefficients, the filter coefficients are transmitted to the multiplication modules 504. The multiplication modules 504 receive the filter coefficients from the coefficient module and perform a multiplication of the filter coefficients with further delayed versions of the reference signal received from delay modules 502 according to a portion of equation 1. A summation module 506 receives the multiplication results from the multiplication modules 504 and determines a sum of the multiplication results of the multiplication modules 504 according to a portion of equation 1. The multiplication modules 504 and the summation module 506 are implemented as separate modules that together perform the complete functionality of equation 1. Alternatively, the multiplication modules 504 and the summation module 506 are both implemented in a single module that performs the functionality of equation 1. After determining the sum of the multiplication results of the multiplication modules 504, the summation module 506 outputs the estimate of the narrowband ingress noise.

Figure 6:
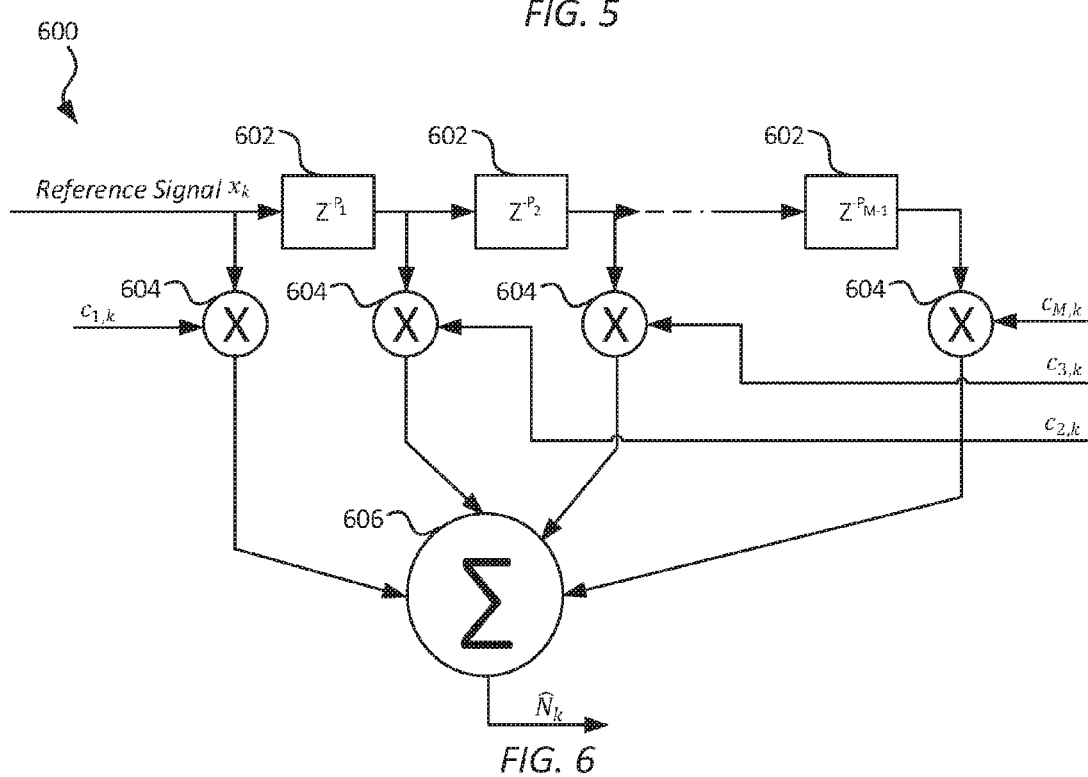
FIG. 6 is a schematic diagram of an embodiment of a decorrelating adaptive filter.

FIG. 6 is a schematic diagram of an embodiment of a decorrelating adaptive filter 600. The decorrelating adaptive filter 600 is implemented in an ALE, such as the decorrelating adaptive filter 404 in the ALE 400. Which may be implemented in the CMTS 110. The decorrelating adaptive filter 600 receives the reference signal that is the delayed version of the primary signal. Implementing the decorrelating adaptive filter 600 in the ALE 400 enables the ALE 400 to determine narrowband ingress noise of a signal in the time domain and in the presence of a data transmission. For example, the decorrelating adaptive filter 600 enables the ALE 400 to determine narrowband ingress noise without scheduling a quiet period in in the signal during which the data transmission is paused. The decorrelating adaptive filter 600 additionally receives an error signal that is an output of the ALE 400. To decorrelate the oversampled band-limited data signal component of the reference signal of ALE 400, the decorrelating adaptive filter 600 is configured to select a plurality of samples of the data symbols by selecting not more than one sample from each data symbol during an iteration k of filtering. Although selecting samples from different data symbols results in the band-limited data signal becoming uncorrelated, the narrowband ingress noise remains a correlated signal due to its slow variation in time. A number of samples selected from the data symbols is determined according to a number of coefficients of the decorrelating adaptive filter 600. For example, for a decorrelating adaptive filter 600 having 3 filter coefficients, samples from 3 different data symbols are selected. For a decorrelating adaptive filter 600 having 4 filter coefficients, samples from 4 different data symbols are selected. Generally, for a decorrelating adaptive filter 600 having M filter coefficients, samples from M different data symbols are selected. For example, using the symbols of diagram 800 for exemplary purposes, in a first iteration of the decorrelating adaptive filter 600 having 5 filter coefficients, samples s1, s4, s7, s10, and s13 are selected. In a second iteration, samples s2, s5, s8, s11, and s14 are selected. In a third iteration, samples s3, s6, s9, s12, and s15 are selected. It should be noted that an order of selection of symbols from which the samples are selected is a matter of design choice.

The decorrelating adaptive filter 600 determines the estimate of the narrowband ingress noise according to the error signal and the reference signal by determining a plurality of filter coefficients. The decorrelating adaptive filter 600 then determines the estimate of the narrowband ingress noise based on the reference signal and the filter coefficients, and according to:

$$\hat{N}_k = \sum_{i=1}^{M} c_{i,k} * x_{k-[\sum_{j=0}^{i-1} P_j]} \quad (3)$$

in which M is a total number of filter coefficients used, $$x_{k-[\sum_{j=0}^{i-1} P_j]}$$

is the reference signal delayed by an additional amount, and $P_j$ is the additional amount of delay.

The decorrelating adaptive filter 600 determines the filter coefficients according to a coefficient module (not shown). The coefficient module determines the filter coefficients based on the reference signal and the error signal, and according to:

$$c_{i,k+1} = c_{i,k} + \mu e_k^* x_{k-[\sum_{j=0}^{i-1} P_j]} \quad (4)$$

in which $c_{i,k}$ is a preceding filter coefficient as determined by the coefficient module, $\mu$ is a step size of the LMS algorithm, and $e_k^*$ is a conjugate of the error signal. After the coefficient module determines the filter coefficients, the filter coefficients are transmitted to the multiplication modules 604. The multiplication modules 604 receive the filter coefficients from the coefficient module and perform a multiplication of the filter coefficients with additionally delayed versions of the reference signal received from delay modules 602 according to a portion of equation 3. The delay modules 602 implement the additional delay into the reference signal used in equations 3 and 4 to enable the decorrelating adaptive filter 600 to select the samples from different data symbols. The delay modules 602 delays the reference signal for filter coefficient i according to $P_{i-1}$ where $P_0=0$. Subsequent delays $P_1, P_2, \ldots, P_{M-1}$ are chosen by the delay modules 602 such that the samples for the successive filter coefficients are not selected from the same data symbol.

A summation module 606 receives the multiplication results from the multiplication modules 604 and determines a sum of the multiplication results of the multiplication modules 604 according to a portion of equation 3. The multiplication modules 604 and the summation module 606 are implemented as separate modules that together perform the complete functionality of equation 3. Alternatively, the multiplication modules 604 and the summation module 606 are both implemented in a single module that performs the functionality of equation 3. After determining the such of the multiplication results of the multiplication modules 604, the summation module 606 outputs the estimate of the narrowband ingress noise.

Although the foregoing descriptions have referred to an ALE, an LMS algorithm, and an LMS traversal filter structure, such descriptions serve only as exemplary implementation manners in which noise cancellation according to the present disclosure may be implemented. As would be understood by one skilled in the art, the noise cancellation of the present disclosure may be implemented in a plurality of applications, algorithms, and filter structures, all of which are within the scope of the present disclosure.

Figure 7:
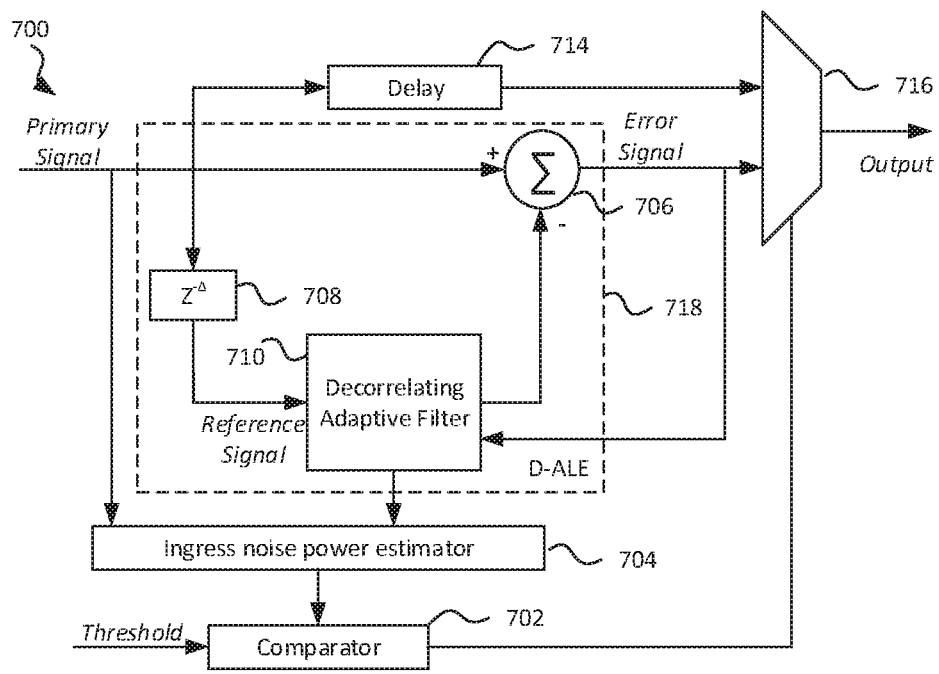
FIG. 7 is a schematic diagram of an embodiment of an ingress noise cancellation unit.

FIG. 7 is a schematic diagram of an embodiment of an ingress noise cancellation unit 700. The ingress noise cancellation unit 700 is implemented in a CMTS, such as the CMTS 110, and performs cancellation of ingress noise in a signal received from an upstream source according to an estimate of ingress noise, for example, as determined by the ALE 400. In some circumstances, coarse cancellation of the narrowband component noise, which is also referred to as the narrowband ingress noise, from a received signal, such as a primary signal, is not necessary due to a relatively low power level of the narrowband component noise. For example, when the power level of the narrowband component noise, such as the estimate of the relative power level of the narrowband component noise according to method 1100, is below a threshold value, the narrowband component noise does not need to be cancelled from the received signal according to a coarse cancellation of a first stage, such as first stage 902 of the method 900, of a CMTS, such as CMTS 110. Accordingly, the ingress noise cancellation unit 700 facilitates selective first state coarse cancellation of narrowband component noise in the CMTS 110.

A comparator 702 compares the estimate of the relative power level of the narrowband component noise to a known threshold value. The threshold value indicates a power level over which the first stage cancellation will be performed, and under which the first stage cancellation will not be performed. The comparator 702 receives the estimate of the relative power level of the narrowband component noise from an ingress noise power estimator 704. When the estimate of the relative power level of the narrowband component noise does not exceed the threshold, the comparator 702 outputs a first control signal, for example, a digital logic "0," When the estimate of the relative power level of the narrowband component noise does exceed the threshold, the comparator 702 outputs a second control signal, for example, a digital logic "1." The ingress noise power estimator 704 is configured to estimate the relative power level of the narrowband component noise according to an estimation method, such as the method 1100, and is implemented in the CMTS 110.

The ingress noise cancellation unit 700 also includes a delay unit 708, a decorrelating adaptive filter 710, and a summation module 706 which are substantially similar to the delay unit 402, the decorrelating adaptive filter 404, and the summation module 406, respectively, as discussed above and not repeated here for the sake of brevity and simplicity. Collectively, the delay unit 708, the decorrelating adaptive filter 710, and the summation module 706 are referred to as a decorrelating ALE (D-ALE) 718, which corresponds to the decorrelating ALE 400 in structure and function. A delay module 714 receives the primary signal and delays the primary signal prior to transmitting the primary signal to a multiplexer 716. An amount of time by which the delay module 714 delays the primary signal corresponds to an amount of time consumed by the decorrelating ALE 718 and comparator 702 prior to providing other inputs to the multiplexer 716. As a result of the delay implemented by the delay module 714, an overall amount of delay of the ingress noise cancellation unit 700 is approximately equal regardless of whether the CMTS 110 performs first stage coarse cancellation of narrowband component noise.

The multiplexer 716 receives the delayed primary signal from the delay module 714, an error signal that comprises the primary signal after first stage coarse cancellation of narrowband component noise from the decorrelating ALE 718, and the first or the second control signal from the comparator 702. According to the first or the second control signal received from the comparator 702, the multiplexer 716 outputs either the delayed primary signal or the primary signal after first stage coarse cancellation of narrowband component noise. For example, when the multiplexer 716 receives the first control signal of "0," the multiplexer 716 outputs the delayed primary signal. When the multiplexer 716 receives the second control signal of "1," the multiplexer 716 outputs the primary signal after first stage coarse cancellation of narrowband component noise.

Figure 8:
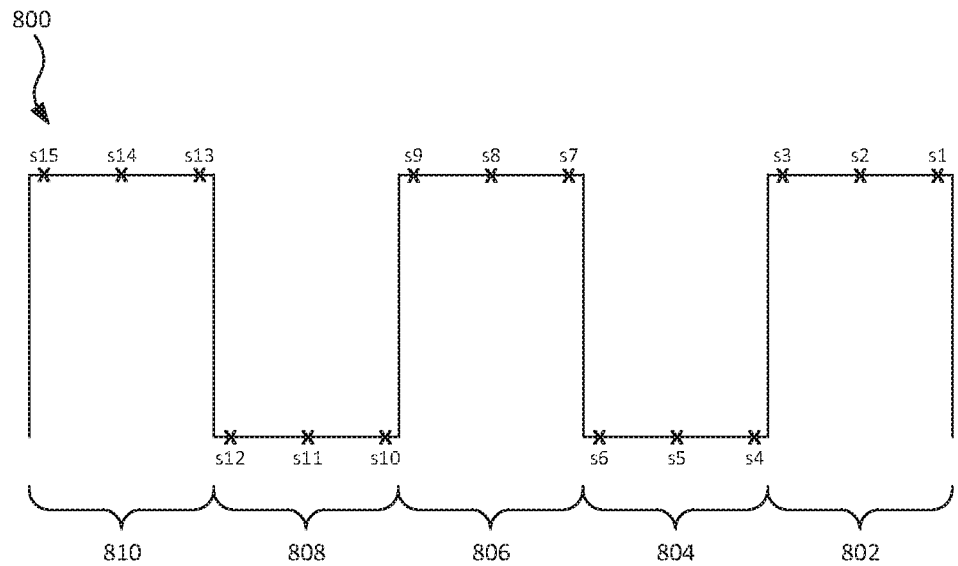
FIG. 8 is a schematic diagram of an embodiment of sampled data symbols.

FIG. 8 is a schematic diagram 800 of an embodiment of sampled data symbols. In various applications, oversampling data symbols, for example, sampling data symbols at greater than one sample, per data symbol is advantageous. The sampling is performed in a first stage of an ingress noise cancellation method, for example, by a CMTS 110 that is implementing the method 900. As shown in diagram 800, the symbols 802, 804, 806, 808, and 810 are sampled at a rate of 3 samples per symbol. For the sake of clarity, narrowband ingress noise and broadband signal noise are not shown on diagram 800, though such noise would be present in the data symbols 802-810 as would be understood by one skilled in the art.

Each symbol 802-810 is uncorrelated with respect to another of the symbols 802-810. However, each sample from one symbol 802-810 is correlated amongst the other samples of the same symbol 802-810. For example, sample s1, s2, and s3 are correlated, because the samples s1, s2, and s3 are all from symbol 802. Samples s1, s5, and s11 are uncorrelated, because the samples s1, s5, and s11 are each from different symbols—symbol 802, symbol 804, and symbol 808, respectively. Generally, a set of samples from the data symbols 802-810 in which each sample of the set of samples is selected from a different one of the data symbols 802-810 results in a set of uncorrelated samples.

Figure 9:
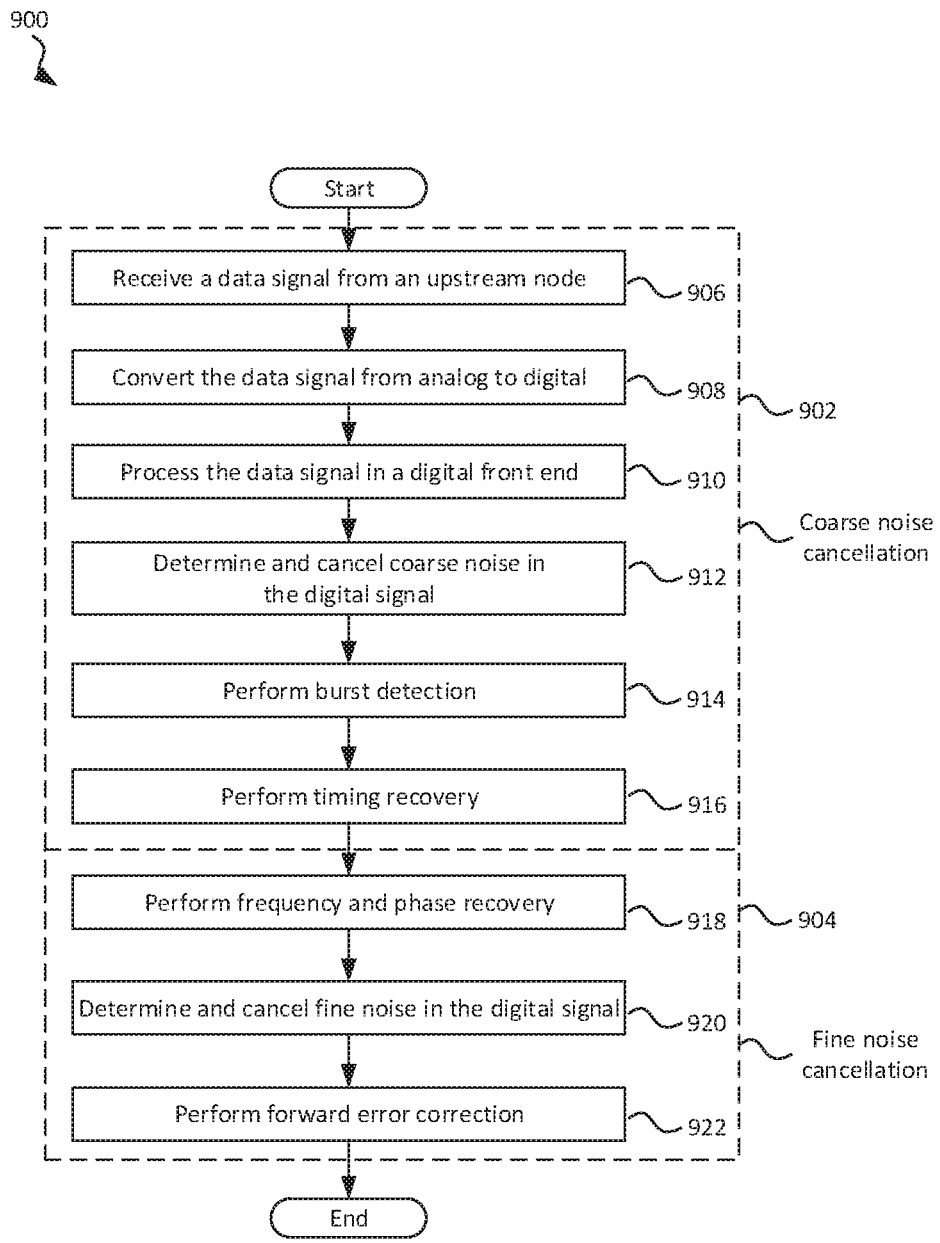
FIG. 9 is a flowchart of an embodiment of a method of ingress noise cancellation.

FIG. 9 is a flowchart of an embodiment of a method 900 of ingress noise cancellation. The method 900 is implemented in a network element, such as the network element 200 to process signals that are received from an upstream source. The method 900 is implemented, for example, in a receiver in a communications system, such as the CMTS 110 in the DOCSIS network 100. To cancel ingress noise, the method 900 comprises a plurality of stages. For example, a first stage 902 that performs coarse noise cancellation and a second stage 904 that performs fine noise cancellation. The first stage 902 is located in a digital front end portion of the network element and samples a data signal of a plurality of data symbols at a rate of two or more samples per symbol. The second stage 904 follows the first stage 902 in the network element and processes the data signal at a sampled rate of 1 sample per symbol.

At step 906, a data signal is received from an upstream node in the network. For example, the data signal is received by the CMTS 110 from the CM 150. The data signal comprises a plurality of symbols that make up the signal's data. At step 908, the data signal is converted from an analog data signal to a digital data signal. For example, the data signal is converted from a continuous analog signal to a digital signal that comprises a plurality of discrete data points according to an analog-to-digital converter (ADC). At step 910, the data signal is processed by a digital front end of the network element. Processing by the digital front end differs according to implementations of the method 900 and includes functions understood by one skilled in the art. For example, the step 910 includes sampling the data signal to form a plurality of samples, for example, 2 samples, per data symbol. Alternatively the data symbols are sampled at any other suitable sampling rate, such as 4 samples per data symbol. At step 912, a first ingress noise canceller determines and cancels coarse noise in the data signal. Cancelling the coarse noise in the data signal at step 912 protects components that perform subsequent steps of the method 900 from damage resulting from the coarse noise which may have a high level of power. The step 912 is performed, for example, by an ALE such as the ALE 400.

At step 914, burst detection is performed on the data signal. The burst detection, for example, determines data bursts for processing that are contained in the data signal. At step 916, timing recovery is performed. The timing recovery enables a network element to synchronize an internal clock rate with a frequency of the data symbols of the data signal, thereby enabling the network element to sample the data symbols at a time in which the data symbol has an optimum value, for example, a maximum, or peak, value. Synchronization is performed, for example, by compensating for a timing phase offset and a timing frequency offset of the data symbols in the digital signal. After the synchronization is established with the data symbols, the data symbols are sampled at a rate of 1 sample per data symbol At step 918, frequency and phase recovery are performed. A network element performs frequency and phase recovery by comparing a frequency and phase of the sampled data symbols to a frequency and phase of a local oscillator of the network element and performing compensation. Compensating the sampled data symbols for frequency and phase variations enables the network element to perform demodulation and processing of the data symbols in the digital signal. At step 920, a second ingress noise canceller cancels fine, or low-level, ingress noise in the digital signal. Cancelling the fine ingress noise improves a MER of the digital signal. The step 920 is performed, for example, by a decision directed based linear predictor implemented in the network element. Alternatively, the step 920 is performed by an ALE such as the ALE 300. At step 922, forward error correction is performed on the data symbols of the data signal prior to the data signal being transmitted to another component for processing. Forward error correction reduces errors in data transmission, for example, through transmission lines that suffer from degradation, high levels of noise, or are unreliable, by introducing redundancy into the data signal. For example, in one implementation of forward error correction, each data symbol of a data signal is transmitted 3 consecutive times. In another implementation of forward error correction, a plurality of previously received data symbols is evaluated to determine how a present data symbol should be read.

Figure 10:
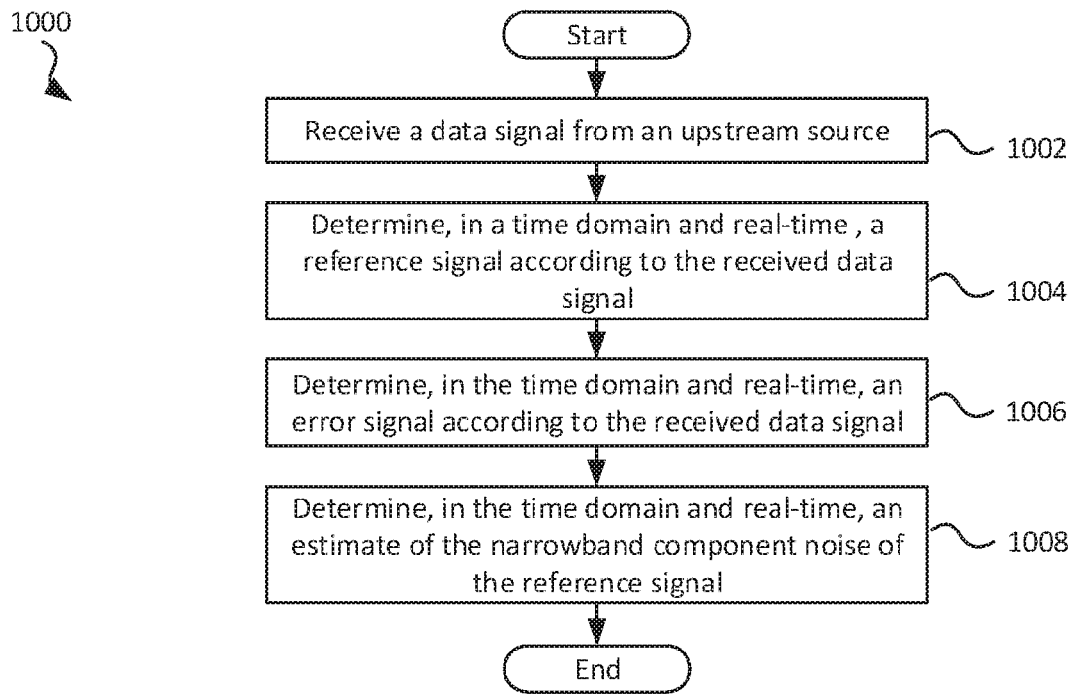
FIG. 10 is a flowchart of an embodiment of another method of ingress noise cancellation.

FIG. 10 is a flowchart of an embodiment of another method 1000 of ingress noise cancellation. The method 1000 is implemented in a network element, such as the CMTS 110, to cancel ingress noise in signals received from an upstream source. At step 1002, a signal is received from an upstream source. For instance, the CMTS 110 located in a central office receives the signal from a CM 150 located in a subscriber location. The received signal comprises a plurality of components, for example, a broadband component noise, a narrowband component noise, and a data component. At step 1004, a reference signal is generated in a time domain according to the received signal. For instance, the CMTS 110 determines the reference signal according to the received signal by delaying the received signal by a predetermined amount of time delta. The CMTS 110 delays the received signal according to a delay module, such as the delay module 402.

At step 1006, an error signal is determined in the time domain based on the received signal. For instance, the CMTS 110 determines the error signal based on the received signal. For example, the CMTS 110 determines the error signal according to a decorrelating ALE, such as the ALE 400, by subtracting an estimate of the narrowband component noise from the received signal. After the CMTS 110 subtracts the estimate of the narrowband component noise from the received signal, the error signal is approximated by the broadband component noise and the data component of the received signal. At step 1008, the estimate of the narrowband component noise of the reference signal is determined in the time domain. For instance, the CMTS 110 determines the estimate of the narrowband component noise according to a decorrelating adaptive filter, such as the decorrelating adaptive filter 600, according to the equations 3 and 4, discussed above. Through processing the received signal in subsequent iterations, the CMTS 110 converges a value of the estimate of the narrowband component noise to an actual value of the narrowband component noise such that the estimate of the narrowband component noise is about equal to the actual value of the narrowband component noise.

Figure 11:
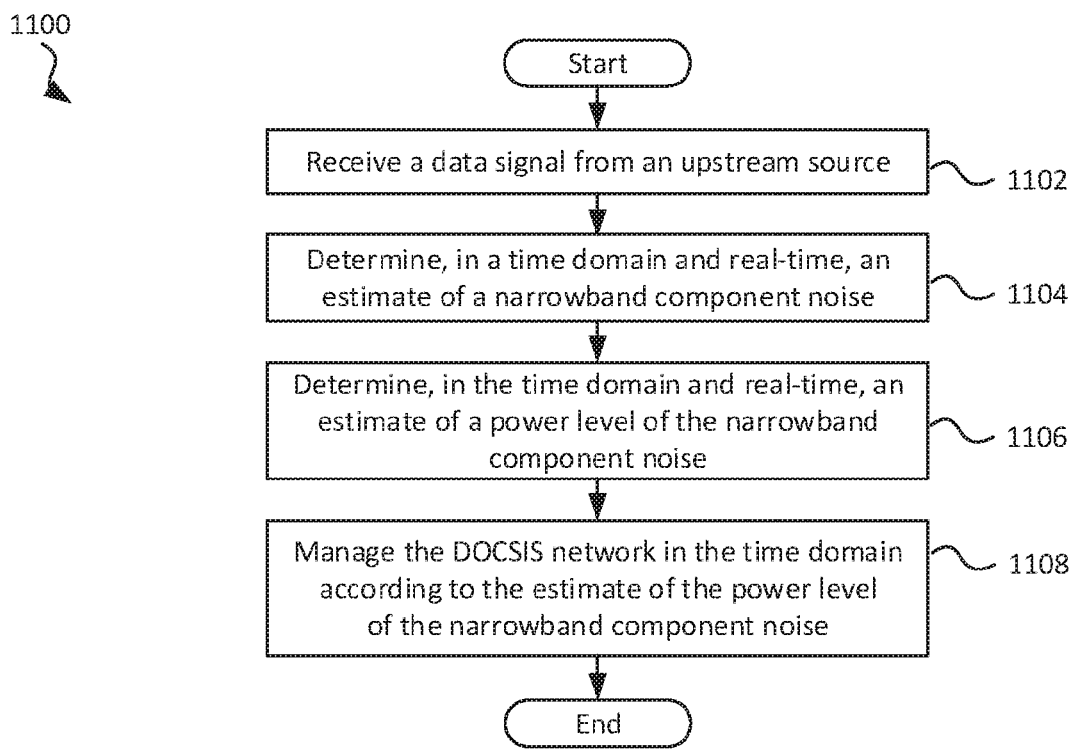
FIG. 11 is a flowchart of an embodiment of a method of ingress noise power estimation.

FIG. 11 is a flowchart of an embodiment of a method 1100 of ingress noise power estimation. According to an estimate of a narrowband component noise of a signal having a narrowband component noise, a broadband component noise, and a data component, an estimate of a power level of the narrowband component noise can be determined by the CMTS 110. The CMTS implements the method 1100 when a signal is received from an upstream source and determines the estimate of the power level of the narrowband component noise, which may also be referred to as an estimate of a power level of ingress noise, according to an output of a decorrelating adaptive filter, such as the ALE 400. Alternatively, the method 1100 is implemented by another adaptive filter understood by one skilled in the art. The method 1100 is implemented in a first stage, a second stage, or both of an ingress noise canceller. For example, the method 1100 is implemented in the first stage 902, the second stage 904, or both, of the method 900. Implementing the method 1100 in both the first stage 902 and the second stage 904 and combining the estimate of the power level of the narrowband component noise according to the estimate of the power level of the narrowband component noise from the first stage 902 and the estimate of the power level of the narrowband component noise from the second stage 904 may increase an accuracy level of the method 1100.

At step 1102, a signal is received from an upstream source. For instance, a CMTS 110 located in a central office receives the signal from a CM 150 located in a subscriber location. The received signal comprises a plurality of components, for example, a broadband component noise, a narrowband component noise, and a data component. At step 1104, an estimate of narrowband component noise is determined in a time domain. For instance, the CMTS 110 determines the estimate of narrowband component noise according to embodiments of the present disclosure as previously discussed. For example, the CMTS 110 determines the estimate of narrowband component noise by implementing the ALE 400 and decorrelating adaptive filter 600 to perform the method 1000 and estimate the narrowband component noise.

At step 1106, an estimate of a power level of the narrowband component noise is determined in the time domain. For instance, the CMTS 110 estimates the power level of the narrowband component noise according to the estimation of the narrowband component noise. Because the value of the estimate of the narrowband component noise converges to the actual value of the narrowband component noise, a variance of the narrowband component noise is approximately equal to a variance of the estimate of the narrowband component noise according to:

$$\mathrm{var}\{N_k\} \cong \mathrm{var}\{\hat{N}_k\} \tag{5}$$

in which var indicates a variance operation. The CMTS 110 estimates the power level of the narrowband component noise in decibels (dB) according to:

$$\text{Estimate in dB} = 10*\log 10[\mathrm{var}\{\hat{N}_k\}] \tag{6}$$

in which log is a logarithmic function. Because the estimate of the power level of the narrowband component noise according to equation 6 is not determined with respect to any other component of the received signal, the estimate of the power level of the narrowband component noise may be referred to as an estimate of the absolute power level of the narrowband component noise.

In a communications system having a signal that comprises a data component and a narrowband component, an estimate of a relative power level of the narrowband component noise with respect to the data component of the received signal, indicated in dBc, is desirable. The CMTS 110 estimates the relative power level of the narrowband component noise in dBc, also referred to as the power level of the narrowband component with respect to the data component, by determining a relationship of the narrowband component noise $N_k$ to the data component $D_k$ according to:

$$\mathrm{var}\{N_k w \cdot r \cdot tD_k\} = \frac{\mathrm{var}\{N_k\}}{\mathrm{var}\{D_k\}} \tag{7}$$

and substituting the equation 7 into the equation 6 as will be shown below. To facilitate processing of the received signal to determine the relative power, the received signal is represented according to:

$$P_k + D_k + N_k + B_k \tag{8}$$

As discussed above, each component of the received signal is by definition uncorrelated with respect to the other components of the received signal. As a result, a variance of the received signal equals a sum of the variances of each component of the received signal according to:

$$\mathrm{var}\{P_k\} = \mathrm{var}\{D_k\} + \mathrm{var}\{N_k\} + \mathrm{var}\{B_k\} \tag{9}$$

Rearranging equation 9 to isolate the variance of the data component, and substituting the variance of the estimate of the narrowband component noise for the variance of the narrowband component noise according to equation 5, results in the variance of the data component being approximately equal to:

$$\mathrm{var}\{D_k\} \cong \mathrm{var}\{P_k\} - \mathrm{var}\{\hat{N}_k\} - \mathrm{var}\{B_k\} \tag{10}$$

The equation 10 and the equation 5 are substituted into the equation 7 to enable processing according to the equation 7 using available results calculated by the CMTS 110. The modified equation 7 with the substituted equations 10 and 5 determines the relationship of the narrowband component noise to the data component according to:

$$\mathrm{var}\{N_k w \cdot r \cdot tD_k\} = \frac{\mathrm{var}\{\hat{N}_k\}}{\mathrm{var}\{P_k\} - \mathrm{var}\{\hat{N}_k\} - \mathrm{var}\{B_k\}} \tag{11}$$

The CMTS 110 estimates the relative power level of the narrowband component noise in dBc by substituting the equation 11 into the equation 6 according to:

$$\text{Estimate in dBc} = 10*\log 10\left[\frac{\mathrm{var}\{\hat{N}_k\}}{\mathrm{var}\{P_k\} - \mathrm{var}\{\hat{N}_k\} - \mathrm{var}\{B_k\}}\right] \tag{12}$$

In communications systems, for example the DOCSIS network 100, a power level of the broadband component noise of a received signal is substantially lower than a power level of the data component of the received signal. For example, the power level of the broadband component noise is 25+ dB lower than the power level of the data component. As a result, the equation 12 is modified to ignore the variance of the broadband component noise and simplify the determination of the estimate of the relative power level of the narrowband component noise. The CMTS 110 estimates the relative power level of the narrowband component noise in dBc based on the simplified equation 12 according to:

$$\text{Estimate in dBc} = 10 * \log 10 \left[ \frac{\text{var}\{\hat{N}_k\}}{\text{var}\{P_k\} - \text{var}\{\hat{N}_k\}} \right] \quad (13)$$

The variance of the estimate of the narrowband component noise and the received signal is determined according to an average, for example, a moving average or a block average. Alternatively, the variance of a signal is referred to as the power of the signal. The estimate of the relative power level of the narrowband component noise is a real-time estimate because the estimate is determined in the time domain without performing processing in the frequency domain, or scheduling quiet periods that are free of data transmissions.

Optionally, the method 1100 includes a step 1108 in which the CMTS 110 manages the DOCSIS network 100 in the time domain according to the estimate of the relative power level of the narrowband component noise. For instance, according to the estimate of the relative power level of the narrowband component noise, the CMTS 110 dynamically adapts signal parameters to control modulation order, forward error correction, and modulation rate. For example, the CMTS 110 transmits one or more signal parameters to the CM 150 that define desired characteristics of a signal received by the CMTS 110 from the CM 150. Additionally, according to the estimate of the relative power level of the narrowband component noise, the CMTS 110 dynamically adds or removes data channels in a set of data channels being processed by the CMTS 110. Additionally, according to the estimate of the relative power level of the narrowband component noise, the CMTS 110 schedules data channels in the DOCSIS network 100 according to quality of service requirements in the DOCSIS network 100. Additionally, according to the estimate of the relative power level of the narrowband component noise, the CMTS 110 increases a Proactive Network Management capability of the DOCSIS network 100. Additionally, according to the estimate of the relative power level of the narrowband component noise, the CMTS 110 determines whether to perform cancellation of the narrowband component noise or not perform cancellation.

Figure 12:
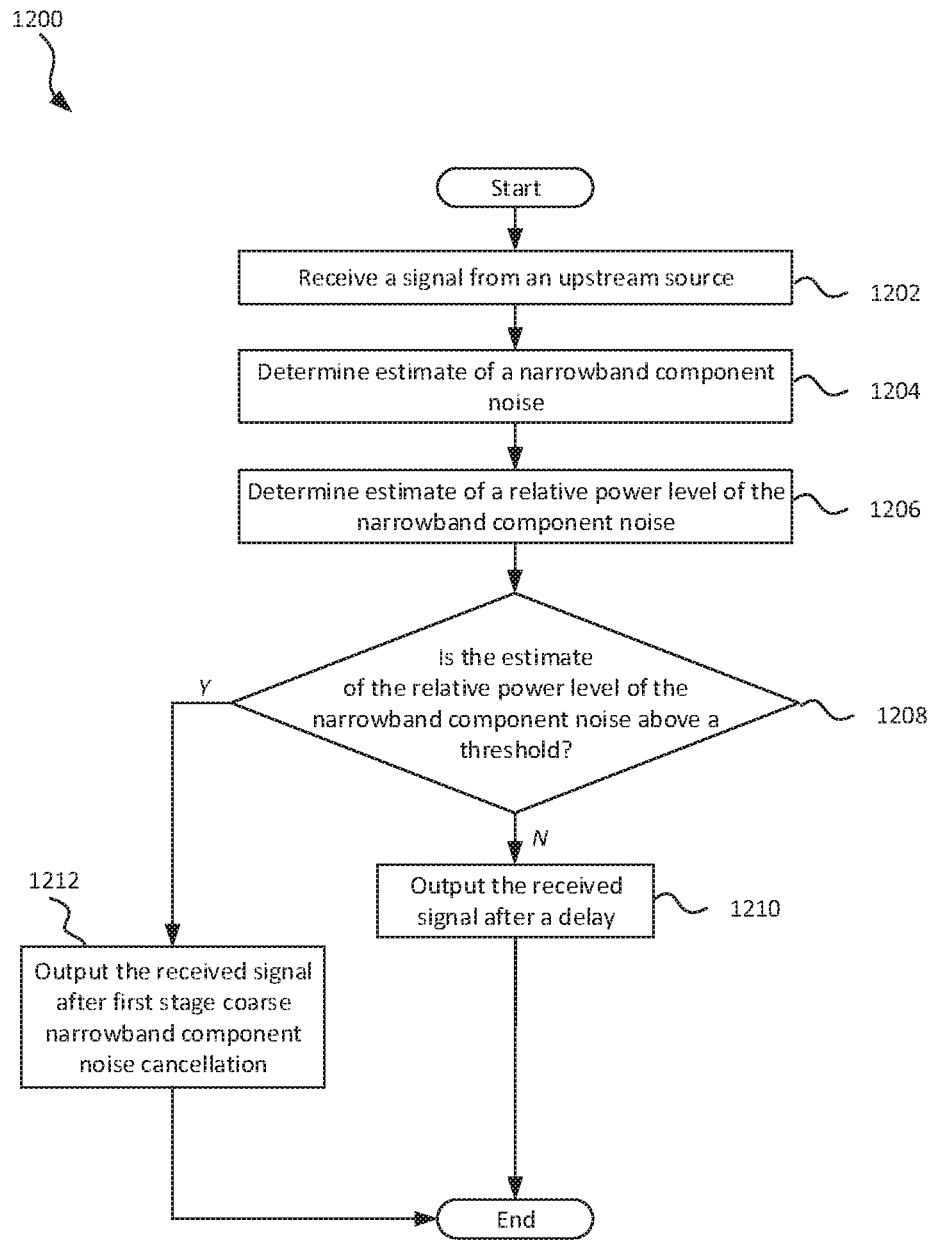
FIG. 12 is a flowchart of an embodiment of a method of bypassing a first stage of ingress noise cancellation.

FIG. 12 is a flowchart of an embodiment of a method 1200 of bypassing a first stage of ingress noise cancellation. The method 1200 is implemented in a CMTS, such as the CMTS 110 to process a signal received from an upstream source by cancelling ingress noise in the signal prior to transmitting the signal to a next signal processing block of the CMTS, or by transmitting the signal to the next signal processing block of the CMTS without performing ingress noise cancellation. At step 1202, a signal is received from an upstream source, for instance a CMTS 110 located in a central office receives the signal from a CM 150 located in a subscriber location. The received signal comprises a plurality of components, for example, a broadband component noise, a narrowband component noise, and a data component. At step 1204, an estimate of the narrowband component noise is determined. For instance, the CMTS 110 determines the estimate of the narrowband component noise according to an ALE, such as the ALE 400 that is configured to implement the method 1000, discussed above. At step 1206, an estimate of a relative power level of the narrowband component noise is determined. For instance, the CMTS 110 determines the estimate of the relative power level of the narrowband component noise according to the ALE 400 that is further configured to implement the method 1100, discussed above.

At decision diamond 1208, a determination is made based on the estimate of the relative power level of the narrowband component noise and a threshold power level. When the estimate of the relative power level of the narrowband component noise does not exceed the threshold power level, at step 1210, the CMTS 110 outputs the received signal after a delay, for example, according to the signal received by the multiplexer 716 from the delay unit 714 in the ingress noise cancellation unit 700. When the estimate of the relative power level of the narrowband component noise exceeds the threshold power level, at step 1212, the CMTS 110 outputs the received signal after first stage coarse cancellation of narrowband component noise, for example, according to the signal received by the multiplexer 716 from the decorrelating ALE. 718 in the ingress noise cancellation unit 700.

Figure 13:
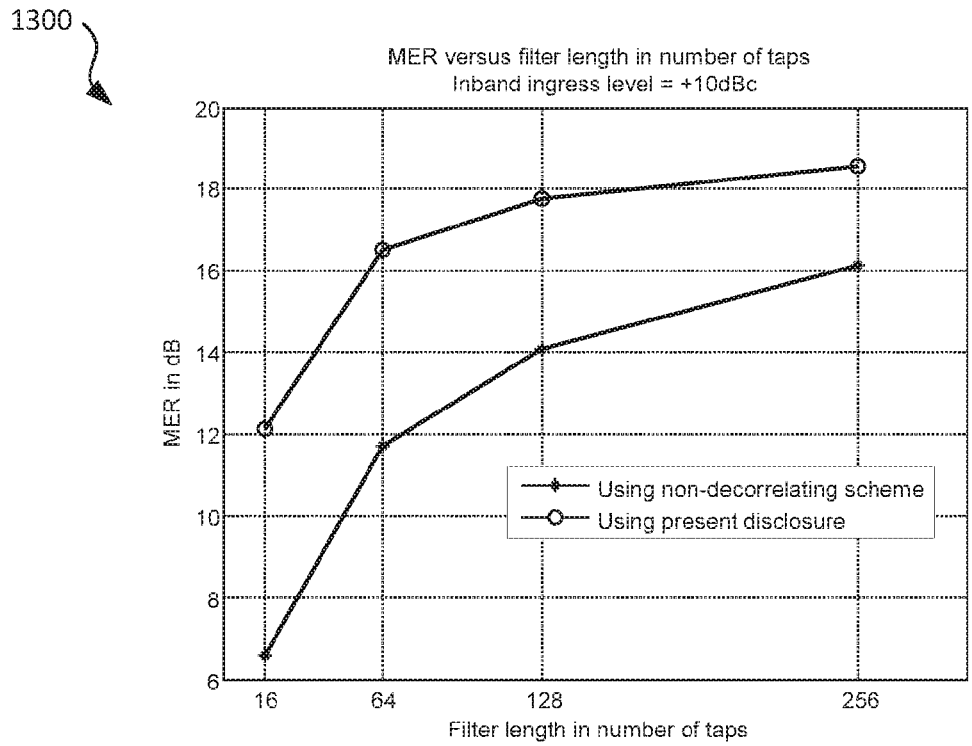
FIG. 13 is a graph of a modulation error ratio (MER) versus filter length in number of taps according to an embodiment of the present disclosure.

FIG. 13 is a graph 1300 of a MER versus filter length in number of taps according to an embodiment of the present disclosure. The MER can also be referred to as a signal-to-noise (SNR) ratio. The graph 1300 illustrates performance according the present disclosure, for example, according to the decorrelating ALE 400, the decorrelating adaptive filter 600, the ingress noise cancellation unit 700, and the methods 1000, 1100, and 1200, compared with performance of a non-decorrelating or traditional ALE and adaptive filter cancellation scheme. In the graph 1300, the X-axis represents a length of a filter, for example a number of filter taps or a number of filter coefficients, used for noise determination and cancellation, and the Y-axis represents the MER measured in dB. As shown in the graph 1300, for a data signal having a plurality of data symbols sampled at a rate of 4 samples per data symbol and an in-band ingress tone level of +10 dBc, processing of the data signal according to the present disclosure results in a MER that is improved over the traditional ALE scheme by an amount ranging from 2.5 dB to 5.5 dB, depending on the filter length.

Figure 14:
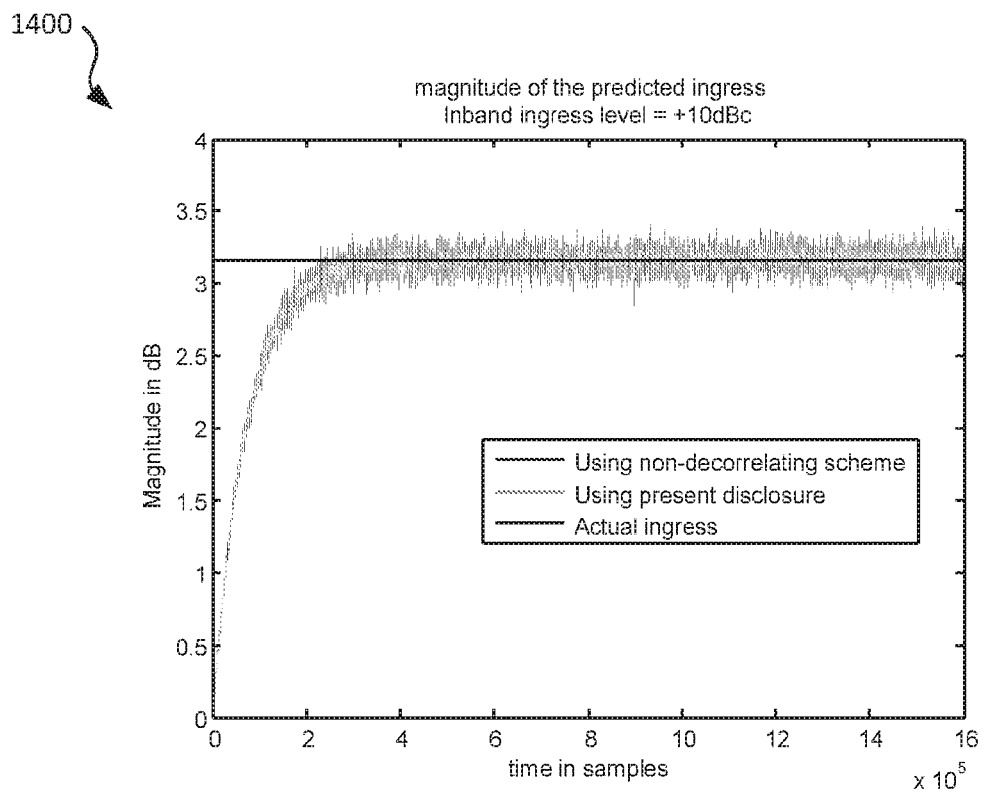
FIG. 14 is a graph of a magnitude of predicted ingress noise according to an embodiment of the present disclosure.

FIG. 14 is a graph 1400 of a magnitude of predicted ingress noise according to an embodiment of the present disclosure. The graph 1400 illustrates a magnitude of estimated narrowband component noise versus time according to processing as disclosed in the present disclosure, for example, according to the decorrelating ALE 400, the decorrelating adaptive filter 600, the ingress noise cancellation unit 700, and the methods 1000, 1100, and 1200, compared with a traditional ALE noise determination and cancellation scheme, and an actual value of the narrowband component noise, in the graph 1400, the X-axis represents an amount of time measured in samples taken of a data signal and the Y-axis represents a linear magnitude of the estimate of the narrowband component noise. As shown in graph 1400, for a data signal at an in-band ingress level of +10 dBc, processing of the data signal according to the present disclosure results in a magnitude of the estimated narrowband component noise that represents the actual narrowband component noise more closely than the traditional ALE scheme.

Figure 15:
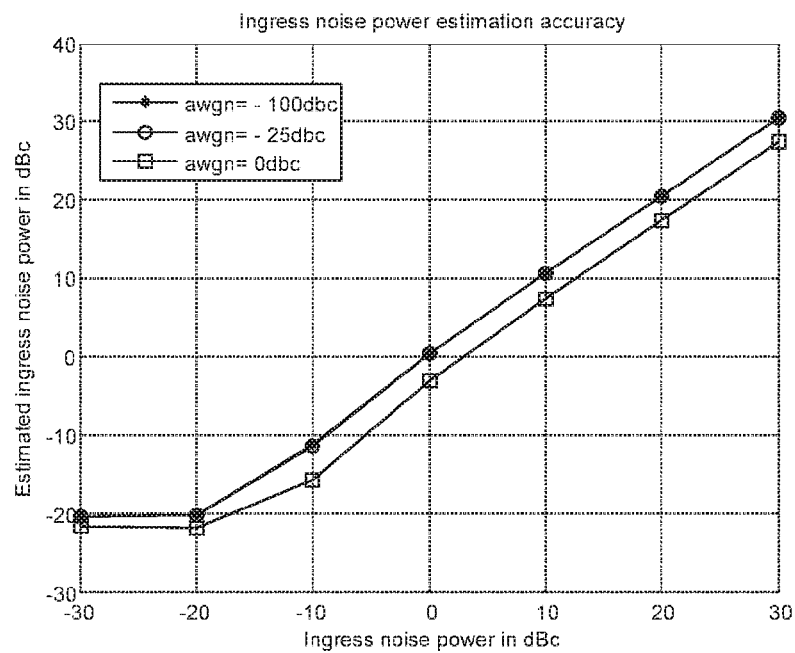
FIG. 15 is a graph of ingress noise power estimation accuracy according to an embodiment of the present disclosure.

FIG. 15 is a graph 1500 of ingress noise power estimation accuracy according to an embodiment of the present disclosure. The graph 1500 illustrates accuracy of an estimate of a power level of narrowband component noise in dBc for a plurality of broadband noise levels in a filter with 16 filter taps and a signal level of 0 dB, as determined according to the present disclosure. In the graph 1500, the X-axis represents an actual value of a power level of the narrowband component noise in dBc and the Y-axis represents an estimated value of the power level of the narrowband component noise in dBc, for example, the estimate according to the method 1100. As shown in the graph 1500, for narrowband component noise power levels greater than −20 dBc, the present disclosure provides for a high degree of accuracy in estimating the power level of the narrowband noise component. It should be noted that the lower limit of −20 dBc in the graph 1500 is a limitation of the exemplary 16-tap filter used in simulation and is not limited according to the present disclosure. Increasing the number of taps in the filter results in an increased range of measurement that allows narrowband component noise below −20 dBc to be determined and cancelled.

Figure 16:
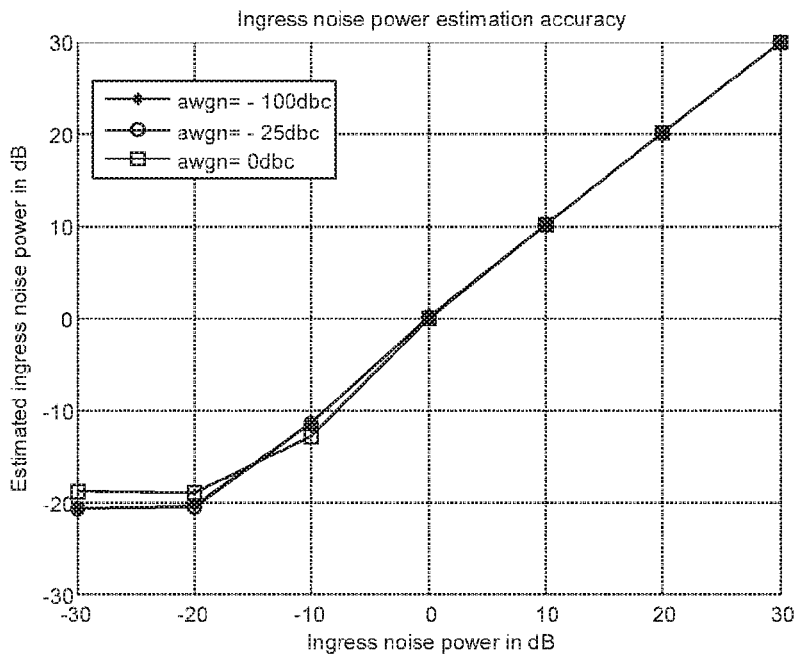
FIG. 16 is a graph of ingress noise power estimation accuracy according to an embodiment of the present disclosure.

FIG. 16 is another graph 1600 of ingress noise power estimation accuracy according to an embodiment of the present disclosure. The graph 1600 illustrates accuracy of an estimate of a power level of narrowband component noise in dB for a plurality of broadband noise levels in a filter with 16 filter taps and a signal level of 0 dB, as determined according to the present disclosure. In the graph 1600, the X-axis represents an actual value of a power level of the narrowband component noise in dB and the Y-axis represents an estimated value of the power level of the narrowband component noise in dB, for example, the estimate according to the method 1100. As shown in the graph 1600, for narrowband component noise power levels greater than 0 dB, the present disclosure provides for a high degree of accuracy in estimating the power level of the narrowband noise component. Again, it should be noted that the lower limit of −20 dBc in the graph 1600 is a limitation of the exemplary 16-tap filter used in simulation and is not limited according to the present disclosure. Increasing the number of taps in the filter results in an increased range of measurement that allows narrowband component noise below −20 dBc to be determined and cancelled.

Figure 17:
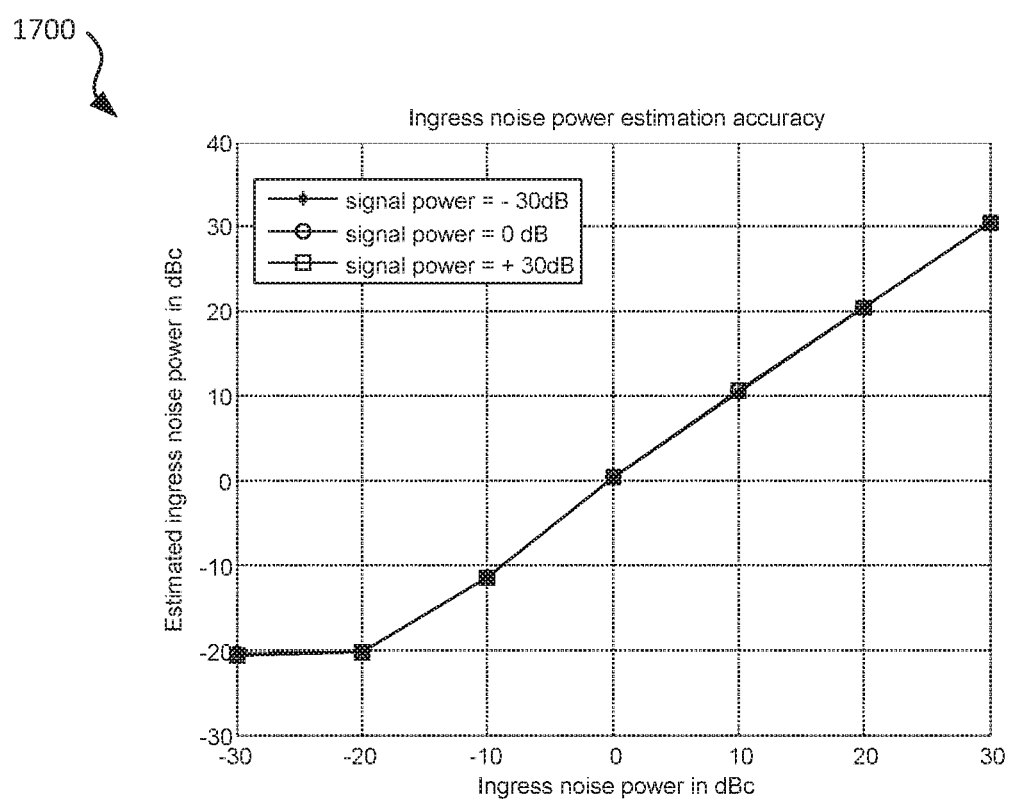
FIG. 17 is a graph of ingress noise power estimation accuracy according to an embodiment of the present disclosure.

FIG. 17 is yet another graph 1700 of ingress noise power estimation accuracy according to an embodiment of the present disclosure. The graph 1700 illustrates narrowband component noise power level estimation accuracy over a range of signal power levels in a filter with 16 filter taps and a broadband component noise of −25 dBc. In the graph 1700, the X-axis represents an actual value of a power level of the narrowband component noise in dBc and the Y-axis represents an estimated value of the power level of the narrowband component noise in dBc. As shown in the graph 1700, for signal power levels ranging from −30 dB to +30 dB, the present disclosure provides for a high degree of accuracy in estimating the power level of the narrowband component noise. It should be noted that processing according to the present disclosure is not limited to processing a signal less than +30 dB. For example, according to embodiments of the present disclosure, a signal having a power level of +40 dB, +50 dB, +60 dB, or any other power level greater than +30 dB are also be processed.

The use of the term "about" means a range including at least ±10 percent (%) of the subsequent number, unless otherwise stated. While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus, comprising:
   a receiver configured to receive a primary signal that comprises a narrowband noise component and a broadband noise component;
   a processor coupled to the receiver and configured to:
   determine, in a time domain, an estimate of the narrowband noise component in real-time;
   determine a cancelled output signal in real-time that comprises an estimate of the broadband noise component; and
   determine an estimate of a power level of the narrowband noise component in real-time.

2. The apparatus of claim 1, wherein the processor further comprises a decorrelating adaptive line enhancer (ALE), comprising:
   a first delay module configured to determine a reference signal according to the primary signal and a first amount of delay;
   a decorrelating adaptive filter coupled to the first delay module and configured to determine the estimate of the narrowband noise component; and
   a first summation module coupled to the decorrelating adaptive filter and configured to subtract the estimate of the narrowband noise component from the primary signal to determine the cancelled output signal.

3. The apparatus of claim 2, wherein the decorrelating adaptive filter comprises:
   a second delay module configured to determine a delayed reference signal according to the reference signal and a second amount of delay;
   a first multiplication module configured to determine a first multiplication result according to a relationship between a first filter coefficient and the reference signal;
   a second multiplication module configured to determine a second multiplication result according to a relationship between a second filter coefficient and the delayed reference signal; and
   a second summation module configured to determine the estimate of the narrowband noise component according to a relationship between the first multiplication result and the second multiplication result.

4. The apparatus of claim 3, wherein the decorrelating adaptive filter is further configured to:
   determine the first filter coefficient according to a relationship between the cancelled output signal, the reference signal, and a first preceding filter coefficient; and
   determine the second filter coefficient according to a relationship between the cancelled output signal, the delayed reference signal, and a second preceding filter coefficient.

5. The apparatus of claim 3, wherein the processor further comprises:
a comparator configured to:
compare the estimate of the power level of the narrowband noise component with a threshold value to form a first comparison output signal when the estimate of the power level of the narrowband noise component is less than or equal to the threshold value; and
compare the estimate of the power level of the narrowband noise component with the threshold value to form a second comparison output signal when the estimate of the power level of the narrowband noise component is greater than the threshold value;
a third delay module configured to determine a delayed primary signal according to the primary signal and a third amount of delay; and
a multiplexer configured to:
receive the delayed primary signal, the cancelled output signal, and the first comparison output signal or the second comparison output signal;
output the delayed primary signal when the first comparison output signal indicates that the estimate of the power level of the narrowband noise component is less than or equal to the threshold value; and
output the cancelled output signal when the second comparison output signal indicates that the estimate of the power level of the narrowband noise component is greater than the threshold value.

6. The apparatus of claim 1, wherein the primary signal further comprises a data component, and wherein the cancelled output signal further comprises an estimate of the data component.

7. The apparatus of claim 6, wherein the processor is further configured to determine the estimate of the power level of the narrowband noise component with respect to the data component.

8. The apparatus of claim 1, wherein the apparatus is a cable modem termination system (CMTS) receiver.

9. The apparatus of claim 1, wherein the apparatus is disposed within a communications network comprising a Data-Over-Cable Service Interface Specifications (DOCSIS) network.

10. The apparatus of claim 1, wherein the processor is further configured to operate in the time domain and not operate in a frequency domain.

11. A method, comprising:
receiving, by a network element operating in real-time in a time domain, a data signal from an upstream source;
determining in the time domain and by the network element operating in real-time, a reference signal according to the received data signal;
determining in the time domain and by the network element operating in real-time, an error signal according to the received data signal; and
determining in the time domain and by the network element operating in real-time, an estimate of a narrowband noise of the reference signal,
wherein the received data signal comprises a datum, a broadband noise, and the narrowband noise.

12. The method of claim 11, wherein the error signal comprises an estimate of the datum corrupted with broadband noise.

13. The method of claim 11, wherein the reference signal comprises the received data signal delayed by a predetermined amount of delay.

14. The method of claim 13, wherein the estimate of the narrowband noise is determined according to a relationship between the error signal and the reference signal.

15. A network element, comprising:
a receiver configured to receive a signal from an upstream source; and
a processor coupled to the receiver and configured to:
determine, in a time domain and operating in real-time, an estimate of a narrowband noise of the signal; and
determine, in the time domain and operating in real-time, an estimate of a power level of the narrowband noise,
wherein the processor is further configured to manage the signal according to the estimate of the power level of the narrowband noise, and
wherein managing the signal comprises transmitting a desired signal parameter to the upstream source.

16. The network element of claim 15, wherein the estimate of the power level of the narrowband noise is greater than or equal to about −30 decibels relative to a power level of the signal.

17. The network element of claim 15, wherein the processor determines the estimate of the power level of the narrowband noise according to a relationship between an average of the estimate of the narrowband noise and an average of the signal.

* * * * *